E. G. JOHANSON.
TRANSLUCENT GLASS.
APPLICATION FILED JUNE 11, 1917.
1,274,054.
Patented July 30, 1918.
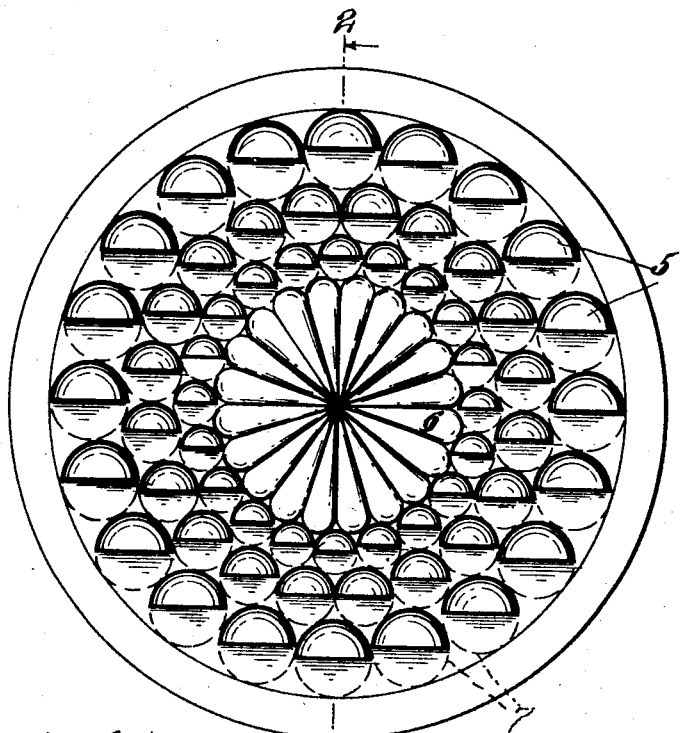
Fig. 1.
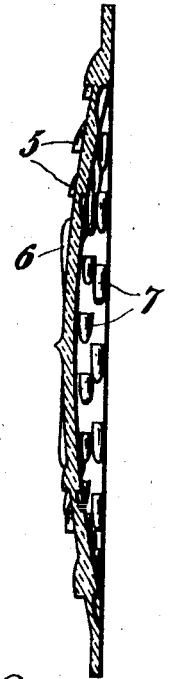
Fig. 2.
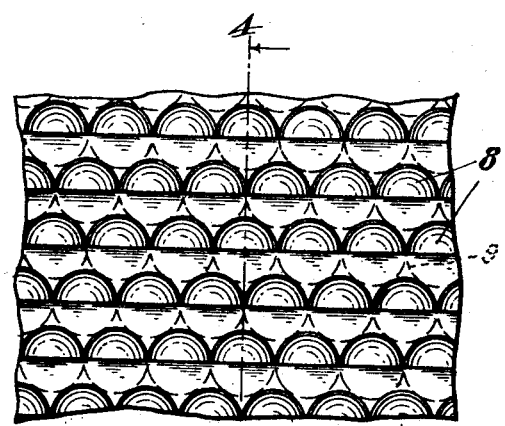
Fig. 3.
Fig. 4.
Emil G. Johanson
INVENTOR.
BY
ATTORNEYS.

UNITED STATES PATENT OFFICE.

EMIL G. JOHANSON, OF CHICAGO, ILLINOIS.

TRANSLUCENT GLASS.

1,274,054.  Specification of Letters Patent.  Patented July 30, 1918.

Application filed June 11, 1917. Serial No. 174,042.

*To all whom it may concern:*

Be it known that I, EMIL G. JOHANSON, a subject of the King of Sweden, residing at Chicago, in the county of Cook and State of Illinois, have invented new and useful Improvements in Translucent Glass, of which the following is a specification.

This invention has for its object to provide a simple and inexpensive glass structure which is translucent, and is designed for use in connection with motor vehicle headlights, office partitions, windows and other places where a glass is desired which transmits light rays diffusively and which eliminates glare.

In order that the invention may be better understood, reference is had to the accompanying drawing forming a part of this specification, in which drawing, Figure 1 is an elevation showing one embodiment of the invention;

Fig. 2 is a cross section on the line 2—2 of Fig. 1;

Fig. 3 is an elevation showing another embodiment of the invention, and

Fig. 4 is a cross section on the line 4—4 of Fig. 3.

The glass shown in Figs. 1 and 2 is designed more particularly for the lens or front of a headlight, it being circular and concavo-convex. The convex side of the glass is formed with a series of semi-circular protuberances 5 arranged in concentric circles, those of one circle being situated in alternation with those of the next inner and outer circles. The protuberances increase in size radially outward from the center of the glass, and at the center is a series of radial ribs 6 tapering toward and meeting at the center. On the reverse or concave side of the glass is a series of semicircular recesses 7 also arranged in concentric circles and in the same order as the protuberances 5. However, the protuberances and the recesses do not coincide or register but are arranged so that they match and form circular lens units, one half of each lens being a protuberance and the other half a recess, the unit thus having the appearance of a complete circular lens when the glass is viewed.

The glass diffuses and softens the light rays passing therethrough, and also eliminates glare. The light is also deflected downward by the arrangement of lenses, resulting in an elimination of the objectionable upwardly slanting glaring rays emanating from the headlight.

Figs. 3 and 4 show a plain glass provided with the same arrangement of protuberances 8 and recesses 9 as that hereinbefore described, the glass being designed for office partitions, windows, or wherever it is desired to have a diffused light.

I claim:—

1. A glass having its surface formed with lens units, each composed of conjugate semicircular protuberances and recesses which are vertically spaced, the protuberances being on one side of the glass and the recesses on the other side.

2. A glass having lens units on its surface, each unit being formed in upper and lower halves, one half being a protuberance on one side of the glass and the other half being a recess in the other side of the glass.

3. A glass having lens units on its surface, each unit being formed in upper and lower halves, one half being a protuberance on one side of the glass and the other half a recess in the other side of the glass, and the units being arranged in concentric circles.

In testimony whereof I affix my signature.

EMIL G. JOHANSON.

*Copies of this patent may be obtained for five cents each, by addressing the "Commissioner of Patents, Washington, D. C."*